United States Patent
Osinski et al.

(10) Patent No.: US 12,549,262 B1
(45) Date of Patent: Feb. 10, 2026

(54) INTEGRATED SILICON PHOTONICS PLATFORMS FOR SCALABLE QUANTUM SYSTEMS

(71) Applicant: STC Rainforest Innovations, Albuquerque, NM (US)

(72) Inventors: Marek Osinski, Albuquerque, NM (US); Ganesh Balakrishnan, Albuquerque, NM (US); Arash Mafi, Albuquerque, NM (US); Roman Sobolewski, Rochester, NY (US)

(73) Assignee: UNM Rainforest Innovations, Albuquerque, NM (US)

( * ) Notice: Subject to any disclaimer, the term of this patent is extended or adjusted under 35 U.S.C. 154(b) by 921 days.

(21) Appl. No.: 17/069,823

(22) Filed: Oct. 13, 2020

Related U.S. Application Data

(60) Provisional application No. 62/914,506, filed on Oct. 13, 2019.

(51) Int. Cl.
*H04B 10/70* (2013.01)
*H10F 77/14* (2025.01)
*H10H 20/812* (2025.01)
*H10N 69/00* (2023.01)

(52) U.S. Cl.
CPC ......... *H04B 10/70* (2013.01); *H10F 77/1433* (2025.01); *H10F 77/1437* (2025.01); *H10H 20/812* (2025.01); *H10N 69/00* (2023.02)

(58) Field of Classification Search
None
See application file for complete search history.

(56) References Cited

U.S. PATENT DOCUMENTS

| | | | | |
|---|---|---|---|---|
| 11,493,713 B1* | 11/2022 | Mendoza | ............... | G06N 10/00 |
| 2006/0289853 A1* | 12/2006 | Chen | ...................... | B82Y 10/00 257/14 |
| 2012/0126286 A1* | 5/2012 | Na | .................... | H01L 31/02005 250/371 |
| 2015/0117826 A1* | 4/2015 | Mazur | ................... | H04B 10/70 385/124 |
| 2015/0277043 A1* | 10/2015 | Shimizu | ............. | G02B 6/12004 438/31 |
| 2020/0044749 A1* | 2/2020 | Rauschenbach | ....... | G06N 10/00 |
| 2021/0020821 A1* | 1/2021 | Nayfeh | ................ | H10N 60/855 |
| 2022/0350220 A1* | 11/2022 | Schneeweiss | ......... | G02F 1/3556 |

OTHER PUBLICATIONS

K. Akabane, N. Yamamoto, and T. Kawanishi, "Fabrication of ultra-high-density InAs quantum dots using the strain-compensation technique", *Physica Status Solidi (a)* 208 (#2), pp. 425-428, Feb. 2011.

A. Aspect, P. Grangier, and G. Roger, "Experimental realization of Einstein-Podolsky-Rosen-Bohm gedankenexperiment: A new violation of Bell's inequalities", *Physical Review Letters* 49, pp. 91-94, 1982.

(Continued)

*Primary Examiner* — Nilufa Rahim
(74) *Attorney, Agent, or Firm* — Keith Vogt, Ltd.; Keith A. Vogt

(57) ABSTRACT

The present invention provides an electronic device having a quantum photonic integrated circuit (QuPIC) including a photonsource, a photon detector and an optical waveguide configured for guiding the photons from the source to the detector.

26 Claims, 3 Drawing Sheets

(56) References Cited

OTHER PUBLICATIONS

S. Atiganyanun, M. Zhou, O. K. Abudayyeh, S. M. Han, and S. E. Han, "Control of randomness in microsphere-based photonic crystals assembled by Langmuir-Blodgett process", *Langmuir* 33 (#48), pp. 13783-13789, Nov. 21, 2017.

G., S. H. Huang, T. J. Rotter, A. Stintz, L. R. Dawson, K. J. Malloy, H. Xu, and D. L. Huffaker, "2.0 um wavelength InAs quantum dashes grown on a GaAs substrate using a metamorphic buffer layer", *Applied Physics Letters* 84 (#12), pp. 2058-2060, Mar. 22, 2004.

C. H. Bennett and G. Brassard, "Quantum cryptography: Public key distribution and coin tossing", *Proceedings of IEEE International Conference on Computers, Systems and Signal Processing*, Bangalore, India, Dec. 10-12, 1984, pp. 175-179.

C. H. Bennett, G. Brassard, and N. D. Mermin, "Quantum cryptography without Bell's theorem", *Physical Review Letters* 68 (#5), pp. 557-559, Feb. 3, 1992.

D. Bouwmeester, J. W. Pan, K. Mattle, M. Eibl, H. Weinfurter, and A. Zeilinger, "Experimental quantum teleportation", *Nature* 390, pp. 575-579, Dec. 11, 1997.

J. F. Clauser, M. A. Horne, A. Shimony, and R. A. Holt, "Proposed experiment to test local hidden-variable theories", *Physical Review Letters* 23 (#15), pp. 880-884, 1969.

W. R. Clements, P. C. Humphreys, B. J. Metcalf, W. S. Kolthammer, and I. A. Walmsley, "Design for universal multiport interferometers", *Optica* 3 (#12), pp. 1460-1465, 2016.

L. De Santis, G. Coppola, C. Antón, N. Somaschi, C. Gómez, A. Lemaître, I. Sagnes, L. Lanco, J. C. Loredo, O. Krebs, and P. Senellart, "Overcomplete quantum tomography of a path-entangled two-photon state", arXiv:1707.07837 [quant-ph].

Ł. Dusanowski, M. Syperek, J. Misiewicz, A. Somers, S. Höfling, M. Kamp, J. P. Reithmaier, and G. Sek, "Single-photon emission of InAs/InP quantum dashes at 1.55 µm and temperatures up to 80 K", *Applied Physics Letters* 108 (#16), Art. 163108 (5 pp.), Apr. 18, 2016.

A. K. Ekert, "Quantum cryptography based on Bell's theorem", *Physical Review Letters* 5 (#5-6), pp. 661-663, Aug. 5, 1991.

A. Fedrizzi, R. Ursin, T. Herbst, M. Nespoli, R. Prevedel, T. Scheidl, F. Tiefenbacher, T. Jennewein, and A. Zeilinger, "High-fidelity transmission of entanglement over a high-loss free-space channel", *Nature Physics* 5, pp. 389-392, May 3, 2009.

J. Feng and R. Akimoto, "Silicon nitride polarizing beam splitter with potential application for intersubband-transition-based all-optical gate device", *Japanese Journal of Applied Physics* 54 (#4s), Art. 04DG08, Mar. 24, 2015.

A. Ferenczi, V. Narasimhachar, and N. Lütkenhaus, "Security proof of the unbalanced phase- encoded Bennett-Brassard 1984 protocol", *Physical Revue A* 86 (#4), Art. 042327, 2012.

V. Giovannetti, S. Lloyd, and L. Maccone, "Quantum metrology", *Physical Review Letters* 96 (#1), Art. 010401 (4 pp.), Jan. 3, 2006.

S. J. Han, S. Ghosh, O. K. Abudayyeh, B. R. Hoard, E. C. Culler, J. E. Bonilla, S. M. Han, and S. E. Han, "Symmetry-breaking nanostructures on crystalline silicon for enhanced light trapping in thin film solar cells", *Optics Express* 24 (#26), pp. A1586-A1596, Dec. 26, 2016.

R. Hanbury Brown and R. Q. Twiss, "A test of a new type of stellar interferometer on Sirius", *Nature* 178 (#4541): pp. 1046-1048, 1956.

S. E. Harris, M. K. Oshman, and R. L. Byer, "Observation of tunable optical parametric fluorescence", *Physical Review Letters* 18 (#18), 732, May 1, 1967.

Y. Hayashi, K. Tanaka, T. Akazaki, M. Jo, H. Kumano, and I. Suemune, "Superconductor-based light emitting diode: Demonstration of role of Cooper pairs in radiative recombination processes", *Applied Physics Express* 1 (#1), Art. 011701 (7 pp.), Jan. 17, 2008.

C. K. Hong, Z. Y. Ou, and L. Mandel, "Measurement of subpicosecond time intervals between two photons by interference", *Physical Review Letters* 59 (#18), pp. 2044-2046, 1987.

P. C. Humphreys, B. J. Metcalf1, T. Gerrits, T. Hiemstra1, A. E. Lita, J. Nunn, S. W. Nam, A. Datta, W. S. Kolthammer, and I. A. Walmsley, "Tomography of photon-number resolving continuous-output detectors", *New Journal of Physics* 17 (#10), Art. 103044 (14 pp.), Oct. 21, 2015.

N. A. Jahan, C. Hermannstädter, J.-H. Huh, H. Sasakura, T. J. Rotter, P. Ahirwar, G. Balakrishnan, K. Akahane, M. Sasaki, H. Kumano, and I. Suemune, "Temperature dependent carrier dynamics in telecommunication band InAs quantum dots and dashes grown on InP substrates", *Journal of Applied Physics* 113 (#3), Art. 033506 (11 pp.), Jan. 21, 2013.

D. F. V. James, P. G. Kwiat, W. J. Munro, and A. G. White, "Measurement of qubits", *Physical Review A* 64 (#5), Art. 052312 (15 pp.), Oct. 16, 2001.

X. M. Jin, J. G. Ren, B. Yang, Z. H. Yi, F. Zhou, X. F. Xu, S. K. Wang, D. Yang, Y. F. Hu, S. Jiang, T. Yang, H. Yin, K. Chen, C. Z. Peng, and J. W. Pan, "Experimental free-space quantum teleportation", *Nature Photonics* 4, pp. 376-381, May 16, 2010.

O. Kahl, S. Ferrari, V. Kovalyuk, G. N. Goltsman, A. Korneev, and W. H. P. Pernice, "Waveguide integrated superconducting single-photon detectors with high internal quantum efficiency at telecom wavelengths", *Scientific Reports* 5, Art. 10941 (4 pp.), 2015.

D. Kato, Y. Idutsu, M. Takada, S. Ito, H. Sato, J.H. Huh, S. Ida, H. Sasakura, H Kumano, and I. Suemune, "High photon extraction efficiency from GaAs pillar with InAs quantum dots embedded in niobium", *Nanophotonic Materials VI, Proceedings of SPIE* 7393, Paper 73930I (8 pp.), Sep. 2, 2009.

P. Kok, W. J. Munro, K. Nemoto, T. C. Ralph, J. P. Dowling, and G. J. Milburn, "Linear optical quantum computing with photonic qubits", *Review of Modern Physics* 79 (#2), pp. 135-174, Jun. 7, 2007.

A. Korneev, A. Semenov, D. Vodolazov, G. N. Gol'tsman, and R. Sobolewski, "Physics and Operation of Superconducting Single-Photon Devices", Chapter in: *Superconductors at the Nanoscale: From Basic Research to Applications* (R. Wördenweber and J. Vanacken, Eds.), Chap. 9, pp. 279-308 *De Gruyter Press*, 2017, and references therein.

P. G. Kwiat, K. Mattle, H. Weinfurter, A. Zeilinger, A. V. Sergienko, and Y. Shih, "New high-intensity source of polarization-entangled photon pairs", *Physical Review Letters* 75 (#24), 4337, 1995.

V. D. Kulakovskii, G. Bacher, R. Weigand, T. Kümmell, A. Forchel, E. Borovitskaya, K. Leonardi, and D. Hommel, "Fine structure of biexciton emission in symmetric and asymmetric CdSe/ZnSe single quantum dots", *Physical Review Letters* 82 (#8), pp. 1780-1783, Feb. 22, 1999.

Q. Li, Y. Han, X. Lu, and K. M. Lau, "GaAs-InGaAs-GaAs fin-array tunnel diodes on (001) Si substrates with room-temperature peak-to-valley current ratio of 5.4", *IEEE Electron Device Letters* 37 (#1), Jan. 2016.

X. S. Ma, T. Herbst, T. Scheidl, D. Wang, S. Kropatschek, W. Naylor, B. Wittmann, A. Mech, J. Kofler, and E. Anisimova, "Quantum teleportation over 143 kilometres using active feed-forward", *Nature* 489, pp. 269-273, 5 Sep. 2012.

A. Mansoori, S. J. Addamane, E. J. Renteria, D. M. Shima, M. Behzadirad, E. Vadiee, C. Honsberg, and G. Balakrishnan, "Reducing threading dislocation density in GaSb photovoltaic devices on GaAs by using AlSb dislocation filtering layers", *Solar Energy Materials and Solar Cells* 185, pp. 21-27, Oct. 31, 2018.

B. J. Metcalf, J. B. Spring, P. C. Humphreys, N. Thomas-Peter, M. Barbieri, W. S. Kolthammer, X. M. Jin, N. K. Langford, D. Kundys, J. C. Gates, B. J. Smith, P. G. R. Smith, and I. A. Walmsley, "Quantum teleportation on a photonic chip", *Nature Photonics* 8, pp. 770-774, Sep. 14, 2014.

E. Nazemosadat, H. Pourbeyram, and A. Mafi, "Phase matching for spontaneous frequency conversion via four-wave mixing in graded-index multimode optical fibers", *Journal of the Optical Society of America B* 33 (#2), pp. 144-150, Feb. 2016.

M. Paul, F. Olbrich, J. Höschele, S. Schreier, J. Kettler, S. L. Portalupi, M. Jetter, and P. Michler, "Single-photon emission at 1.55 um from MOVPE-grown InAs quantum dots on InGaAs/GaAs metamorphic buffers", *Applied Physics Letters* 111 (#3), Art. 033102 (4 pp.), Jul. 17, 2017.

(56) References Cited

OTHER PUBLICATIONS

H. Pourbeyram, E. Nazemosadat, and A. Mafi, "Detailed investigation of intermodal four-wave mixing in SMF-28: Blue-red generation from green", *Optics Express* 23 (#11), pp. 14487-14500, Jun. 1, 2015.
H. Pourbeyram and A. Mafi, "Four-wave mixing of a laser and its frequency-doubled version in a multimode optical fiber", *Photonics* 2 (#3), pp. 906-915, Aug. 27, 2015.
H. Pourbeyram and A. Mafi, "Photon pair generation in multimode optical fibers via intermodal phase matching", *Physical Review A* 94 (#2), Art. 023815 (5 pp.), Aug. 5, 2016.
H. Pourbeyram and A. Mafi, "Nonlinear mode conversion for intermodal four-wave mixing Stokes and anti-Stokes in a multimode fiber", *Nonlinear Frequency Generation and Conversion: Materials and Devices XVI* (K. L. Vodopyanov and K. L. Schepler, Eds.), SPIE LASE, Photonics West, San Francisco, CA, Jan. 30-Feb. 1, 2017, Proceedings of SPIE 10088, Paper 1008817 (6 pp.).
H. Pourbeyram and A. Mafi, "Strong frequency dependence of the third order Kerr nonlinear susceptibility in a silica fiber", *Nonlinear Optics (NLO)*, Waikoloa, Hawaii, Jul. 17-21, 2017.
H. Pourbeyram and A. Mafi, "Ultra-broadband factorable photon pair generation in a graded index multimode fiber", *Nonlinear Optics (NLO)*, Waikoloa, Hawaii, Jul. 17-21, 2017.
H. Pourbeyram and A. Mafi, "State-engineered photon pair generation in graded-index multimode optical fibers", *Advances in Photonics of Quantum Computing, Memory, and Communication XI* (Z. U. Hasan, P. R. Hemmer, A. E. Craig, and A. L. Migdall, Eds.), SPIE OPTO, Photonics West, San Francisco, CA, Jan. 29-31, 2018, *Proceedings of SPIE* 10547, Paper 105470S.
H. Pourbeyram and A. Mafi, "Photon pair generation with tailored frequency correlations in graded-index multimode fibers", *Optics Letters* 43 (#9), pp. 2018-2021, May 1, 2018.
N. Rahimi, A. A. Aragon, O. S. Romero, D. M. Shima, T. J. Rotter, G. Balakrishnan, S.D. Mukherjee, and L.F. Lester, "Ultra-low resistance NiGeAu and PdGeAu ohmic contacts on n-GaSb grown on GaAs", *2013 IEEE 39th in Photovoltaic Specialists Conference (PVSC)*, pp. 2123-2126, Jun. 2013.
N. Rahimi, A. A. Aragon, O. S. Romero, D. M. Shima, T. J. Rotter, S. D. Mukherjee, G. Balakrishnan, and L.F. Lester, "Electrical and microstructure analysis of nickel-based low-resistance ohmic contacts to n-GaSb", *APL Materials* 1 (#6), Art. 062105 (8 pp.), Dec. 1, 2013.
N. Rahimi, A. A. Aragon, O. S. Romero, D. M. Shima, T. J. Rotter, S. D. Mukherjee, G. Balakrishnan, and L.F. Lester, "Low resistance palladium/molybdenum based ohmic contacts to n-GaSb grown on GaAs", *Journal of Vacuum Science & Technology: Part B—Microelectronics & Nanometer Structures* 32 (#4), Art. 04E108 (6 pp.), Jul. 2014.
E. J. Renteria, P. Ahirwar, S. P. Clark, O. S. Romero, S. J. Addamane, C. P. Hains, T. J. Rotter, L. R. Dawson, O. Lavrova, L. F. Lester, and G. Balakrishnan, "Isolation and characterization of large-area GaSb membranes grown on GaAs substrates", *2013 IEEE 39th in Photovoltaic Specialists Conference (PVSC)*, pp. 2459-2461, Jun. 2013.
E. J. Renteria, A. J. Muniz, S. J. Addamane, D. M. Shima, C. P. Hains, and G. Balakrishnan, "Isolating GaSb membranes grown metamorphically on GaAs substrates using highly selective substrate removal etch processes", *Journal of Electronic Materials* 44 (#5), pp. 1327-1331, May 1, 2015.
O. S. Romero, A. A Aragon, N. Rahimi, D. Shima, S. J. Addamane, T. J. Rotter, S. D. Mukherjee, L. R. Dawson, L. F. Lester, and G. Balakrishnan, "Transmission electron microscopy-based analysis of electrically conductive surface defects in large area GaSb homoepitaxial diodes grown using molecular beam epitaxy", *Journal of Electronic Materials* 43 (#4), pp. 926-930, Apr. 1, 2014.
T. J. Rotter, A. Stintz, and K. J. Malloy, "InP based quantum dash lasers with 2 um wavelength", *IEE Proceedings—Optoelectronics* 150 (#4), pp. 318-321, Aug. 1, 2003.
C. Santori, D. Fattal, M. Pelton, G. S. Solomon, and Y. Yamamoto, "Polarization-correlated photon pairs from a single quantum dot", *Physical Review B* 66 (#4), Art. 045308 (4 pp.), Jul. 16, 2002.
L. Seravalli, M. Minelli, P. Frigeri, S. Franchi, G. Guizzetti, M. Patrini, T. Ciabattoni, and M. Geddo, "Quantum dot strain engineering of InAs/InGaAs nanostructures", *Journal of Applied Physics* 101 (#2), Art. 024313 (9 pp.), Jan. 15, 2007.
D. J. Saunders, J. H. D. Munns, T. F. M. Champion, C. Qiu, K. T. Kaczmarek, E. Poem, P. M. Ledingham, I. A. Walmsley, and J. Nunn, "Cavity-enhanced room-temperature broadband Raman memory", *Physical Review Letters* 116 (#9), Art. 090501 (5 pp.), Mar. 3, 2016.
P. Sibson, C. Erven, M. Godfrey, S. Miki, T. Yamashita, M. Fujiwara, M. Sasaki, H. Terai, M. G. Tanner, C. M. Natarajan, R. H. Hadfield, J. L. O'Brien, and M. G. Thompson, "Chip-based quantum key distribution", *Nature Communications* 8, Art. 13984, 2017.
J. W. Silverstone, R. Santagati, D. Bonneau, M. J. Strain, M. Sorel, J. L. O'Brien, and M. G. Thompson, "Qubit entanglement between ring-resonator photon-pair sources on a silicon chip", *Nature Communications* 6, Art. 7948, 2015.
J. B. Spring, P. L. Mennea, B. J. Metcalf, P. C. Humphreys, J. C. Gates, H. L. Rogers, C. Söller, B. J. Smith, W. S. Kolthammer, P. G. R. Smith, and I. A. Walmsley, "A chip-based array of near-identical, pure, heralded single photon sources", *Optica* 4 (#1), pp. 90-96, 2017.
R. Stolen, "Phase-matched-stimulated four-photon mixing in silica-fiber waveguides", *IEEE Journal of Quantum Electronics* 11 (#3), pp. 100-103, Mar. 1975.
I. Suemune, T. Akazaki, K. Tanaka, M. Jo, K. Uesugi, M. Endo, H. Kumano, E. Hanamura, H. Takayanagi, M. Yamanishi, and H. Kan, "Superconductor-based quantum-dot light-emitting diodes: Role of Cooper pairs in generating entangled photon pairs", *Japanese Journal of Applied Physics* 45 (#12), pp. 9264-9271, Dec. 7, 2006.
I. Suemune, S. Hirotaka, H. Yujiro, T. Kazunori, A. Tatsushi, A. Yasuhiro, and I. Ryotaro, "Cooper-pair radiative recombination in semiconductor heterostructures: Impact on quantum optics and optoelectronics", *Japanese Journal of Applied Physics* 51 (#1R), Art. 010114 (11 pp.), Dec. 6, 2011.
I. Suemune, H. Nakajima, X. Liu, S. Odashima, T. Asano, H. Iijima, J .- H. Huh, Y. Idutsu, H. Sasakura, and H. Kumano, "Metal-coated semiconductor nanostructures and simulation of photon extraction and coupling to optical fibers for a solid-state single-photon source", *Nanotechnology* 24 (#45), Art. 455205 (9 pp.), Oct. 18, 2013.
I. Suemune, S. Hirotaka, A. Yasuhiro, K. Hidekazu, I. Ryotaro, T. Kazunori, A. Tatsushi, and T. Hideaki, "Photon-pair generation based on superconductivity", *IEICE Electronics Express* 9 (#14), pp. 1184-1200, Jul. 25, 2012.
R. Ursin, F. Tiefenbacher, T. Schmitt-Manderbach, H. Weier, T. Scheidl, M. Lindenthal, B. Blauensteiner, T. Jennewein, J. Perdigues, P. Trojek, B. Ömer, M. Fürst, M. Meyenburg, J. Rarity, Z. Sodnik, C. Barbieri, H. Weinfurter, and A. Zeilinger, "Entanglement-based quantum communication over 144 km", *Nature Physics* 3, pp. 481-486, Jun. 3, 2007.
E. Vadiee, E. J. Renteria, C. Zhang, J. J. Williams, A. Mansoori, S. J. Addamane, G. Balakrishnan, and C. B. Honsberg, "AlGaSb-based solar cells grown on GaAs: Structural investigation and device performance", *IEEE Journal of Photovoltaics* 7 (#6), pp. 1795-1801, Nov. 2017.
E. Vadiee, Y. Fang, C. Zhang, A. M. Fischer, J. J. Williams, E. J. Renteria, G. Balakrishnan, and C. B. Honsberg, "Temperature dependence of GaSb and AlGaSb solar cells", *Current Applied Physics*, 18 (#6), pp. 752-761, Jun. 1, 2018.
I. A. Walmsley and M. G. Raymer, "Toward quantum-information processing with photons", *Science* 307 (#5716), pp. 1733-1734, Mar. 18, 2005.
I. A. Walmsley, "Quantum optics: Science and technology in a new light", *Science* 348 (#6234), pp. 525-530, May 1, 2015.
I. A. Walmsley, "Integrated quantum optics", *Optical Society of America 2017 European Conference on Lasers and Electro-Optics and European Quantum Electronics Conference*, Munich, Germany, Jun. 25-29, 2017, Paper EA-8-4.
R. H. Wang, A. Stintz, p. M. Varangis, T. C. Newell, H. Li, K. J. Malloy, and L. F. Lester, "Room-temperature operation of InAs

(56) References Cited

OTHER PUBLICATIONS quantum-dash lasers on InP (001)", *IEEE Photonics Technology Letters* 13 (#8), pp. 767-769, Aug. 2001.

C. Wang, K. Schires, M. Osiński, P. J. Poole, and F. Grillot, "Thermally insensitive determination of the linewidth broadening factor in nanostructured semiconductor lasers using optical injection locking", *Scientific Reports* 6, Art. 27825 (8 pp.), Jun. 15, 2016.

J. Yin, J. G. Ren, H. Lu, Y. Cao, H. L. Yong, Y. P. Wu, C. Liu, S. K. Liao, F. Zhou, and Y. Jiang, "Quantum teleportation and entanglement distribution over 100-kilometre free-space channels", *Nature* 488, pp. 185-188, Aug. 8, 2012.

\* cited by examiner

INTEGRATED SILICON PHOTONICS PLATFORMS FOR SCALABLE QUANTUM SYSTEMS

RELATED APPLICATIONS

This application claims priority to U.S. Provisional Application No. 62/914,506, filed on Oct. 13, 2019, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

FIELD OF THE INVENTION

The present invention relates to integrated silicon photonics platforms and, in particular, to silicon photonics platforms for scalable quantum systems.

BACKGROUND OF THE INVENTION

Quantum information processing (QuIP) relies on the extraction, processing and manipulation, as well as transmission and detection of information by exploiting quantum properties of light and matter. QuIP technologies include provably secure communications, ultraprecise sensors, and radically new, powerful computers. QuIP is expected to be used to secure and scale-up multiparty quantum computations to tackle computational problems that will likely remain outside the reach of classical computers, such as large-scale molecular simulations for material design and drug discovery; or it can connect a network of distributed quantum sensors for ultraprecise measurements with applications to biological imaging, gravitometry, and position-navigation-timing.

In the broader landscape of QuIP, quantum communication (QC) plays a special role, because it enables transfer of a quantum state from one location to another. It can be used to implement a secure data transmission network (quantum Internet), leveraging the concept of quantum cryptography, where the security of transmission is guaranteed by the basic laws of quantum physics (no-cloning theorem).

QC systems (QCSs) are based on photons and are to a large extent similar to classical optical communication systems. At a minimum, they require a source for photon generation, a detector, and a channel to transmit photons between the source and the detector. Most importantly, however, a QCS leverages the counterintuitive quantum principles of superposition and entanglement based on special protocols that allow tasks which are not possible by classical means. QC can be implemented with discrete variables (qubits) or using continuous-variable quantum information carriers. While protocols based on continuous-variable quantum information carriers, instead of qubits, are extremely powerful, the current state-of-the-art QC both in bit-rate and transmission distance primary rely on polarization-based qubits.

The field of quantum information science is on the verge of disruptive breakthroughs, with a potential for having a high impact on society and national security. It can enable encoding, processing and extracting information in ways that will most likely be impossible using classical methods. The reach will be broad, from the design of custom materials to breakthroughs in drug discovery to secure commerce. QC resides at the core of all these breakthroughs as an enabling technology by connecting networks of quantum computers for multi-party processing or enabling communications with absolute security rooted in the laws of physics.

Over the last decade, there has been tremendous progress in science and technology related to the generation, manipulation, storage, propagation, and detection of photons for QuIP. Much of this progress has been focused on developing individual components that satisfy the rather stringent requirements of QuIP at the single-photon level. Integrating these individual components into complete QuIP systems with optimized operation for various components is a challenging task that requires an interdisciplinary approach. Individual elements of the system, some based on rather sophisticated technologies, are often implemented and tested using off-the-shelf optical components that are not necessarily practical at a system integration level. High-quality sources and detectors are often tested and implemented into systems with bulk polarization components and coupled to optical fibers with bulk optics. The move beyond individual discrete components in a QuIP system necessitates a new paradigm that can integrate various components on a single chip and optimize the system performance.

Building a quantum network requires scalable schemes for high-fidelity generation, manipulation, transmission, and detection of non-classical and entangled photons. One can envision that an initial implementation of a network will involve point-to-point quantum links connecting simple nodes for secure quantum communications, especially in the realm of quantum key distribution. This can be followed up in the future with an enhanced implementation that would leverage quantum repeaters and scale to an internet-like quantum network to connect spatially-separated quantum processors, implement long-distance quantum-secure key distribution, and connect distributed high-resolution quantum sensors.

As the complexity of QuIP architectures increases, there is a great need for stable high-quality nonclassical solutions. The anticipated demand for multiparty QCSs to connect computers, sensors, or to exchange ultrasecure information hints at a strong future demand for miniaturization, as well as proper power management. These naturally lead to integrated platforms based on silicon or other suitable materials for chip-scale QuIP systems, which can provide the scalability, stability, robustness, and ease of alignment compared with hybrid, bulk-element implementations. Much of the success in QuIP has been achieved in proof-of-concept hybrid systems that eventually need to be replaced by integrated platforms, not unlike the changes that took place over the past decade in classical communications, e.g., in the development of silicon optical modulators for integrated transceivers. Similarly, the realization of future QuIP technologies will necessitate miniaturization and integration of high-quality single-photon sources and detectors, and photonic quantum circuit elements for manipulating and distributing the single photons, including binary-entangled or multi-photon-correlated platforms.

In order to aim for the best practices in making the photonic quantum integrated circuits, one must consider the demands on the performance of the single-photon transmitters and detectors, and the transmission channel. In particular, efficient transmitters are often required to generate single photons or entangled photon-pair states. Single-photon Fock states are highly desired for ease of implementation and manipulations, for instance using the BB84 QC protocol. An ideal single-photon source emits a single photon with a 100% probability in response to an external trigger. As such, the probability for emitting no photons or more than one photon should ideally be zero. Unfortunately, ideal single-photon states are quite difficult to realize experimentally. Even for near-ideal sources, there are various constraints and requirements for single-photon generation. Ideally, the operating temperature should be near room temperature, while often the narrowest linewidths and minimal dephasing for sources are observed at cryogenic temperatures. In practice, liquid nitrogen cooling at 77 K is significantly more practical than liquid helium cooling. The wavelength of a single-photon source is another important characteristic. The source should be narrow-band, stable, and operate at the desired wavelength, e.g., in the telecommunication C-band (around 1.55 µm) or O-band (around 1.32 µm) for fiberoptic networks. In modern networks, the desired data transmission speed is in the range of 1-10 Gb/s. There can be stringent requirements on the efficiency of photon generation that, depending on the implementation scheme, error correction mechanisms, and other components, ranges from 66% to as high as 99%. The polarization is also an important property and in some implementations great polarization stability and a high level of control on polarization are required.

Similar properties are demanded from photon-pair generators. Generation of photon pairs and preparing them in a specific quantum state, from highly entangled to factorable photon pairs, is the backbone of many quantum optical technologies. Photon pair generation is important for applications that use quantum entanglement or heralded photon detection. The former requires strong correlation between the two photons, while the latter demands no correlation. Photons that are generated in pairs using spontaneous parametric down-conversion or spontaneous four-wave mixing (FWM) do not necessarily have the right amount of correlation in the desired degrees of freedom (frequency, polarization, phase, or spatial mode). Therefore, it is very important to tailor the quantum state of photon. In particular, great effort must be placed on ensuring that the photon pairs in entangled photon implementations are indistinguishable.

Depending on the configuration of the photon source, the photon pairs can be correlated in frequency, polarization, phase, or spatial mode. Some QC protocols (with discrete variables) were originally proposed as polarization-based, for example BB84 and BBM92. Full knowledge of the photon-pair states can be obtained by quantum-state tomography by making measurements on 16 or more configurations in polarization or phase or other attributes used to encode the quantum information. In order to perform on-chip polarization-based QC, it is necessary to integrate various polarization components at the chip-scale. This is a relatively uncharted territory, and only limited success has been reported thus far in such integration schemes, such as a silicon nitride polarizing beam splitter. The device works on the basis of a Mach-Zehnder interferometer (MZI) consisting of two directional coupler structures, where the TE-polarized photons can couple to the cross port, while the TM-polarized photons are output from the through port under the MZI configuration.

BRIEF SUMMARY OF THE INVENTION

In one embodiment, the present invention provides a system and method concerning integrated silicon photonics platforms and, in particular, silicon photonics platforms for scalable quantum systems.

In other embodiments, the present invention provides a silicon quantum photonic integrated circuit (SiQuPIC).

In other embodiments, the present invention provides a silicon quantum photonic integrated circuit (SiQuPIC) having a photon source, waveguide, photodetector and a substrate.

In other embodiments, the present invention provides a silicon quantum photonic integrated circuit (SiQuPIC) having a photon source that is a semiconductor quantum-dot light-emitting diode (QD LED).

In other embodiments, the present invention provides a silicon quantum photonic integrated circuit (SiQuPIC) having a photon source that is a semiconductor QD LED, wherein the semiconductor QD LED comprises a superconducting layer, thus forming a superconducting QD LED (SQLED).

In other embodiments, the present invention provides a silicon quantum photonic integrated circuit (SiQuPIC) having a photon source that is a superconducting QD LED (SQLED), wherein the SQLED is a single-photon emitter.

In other embodiments, the present invention provides a silicon quantum photonic integrated circuit (SiQuPIC) having a photon source that is a semiconductor superconducting QD LED (SQLED), wherein the SQLED comprises a superconducting layer and wherein the superconducting material is adjacent to a quantum well embedding QDs, enabling entangled photon pair emission.

In other embodiments, the present invention provides a silicon quantum photonic integrated circuit (SiQuPIC) having a photon source that is a semiconductor QD LED, wherein selective-area epitaxy is used to grow the semiconductor QD LED directly in patterned $SiO_2$ on silicon.

In other embodiments, the present invention provides a silicon quantum photonic integrated circuit (SiQuPIC) having a photon source that is a semiconductor QD LED, wherein the semiconductor QD is aligned with the waveguide core.

In other embodiments, the present invention provides a silicon quantum photonic integrated circuit (SiQuPIC) having a waveguide core made of $Si_3N_4$.

In other embodiments, the present invention provides a silicon quantum photonic integrated circuit (SiQuPIC) having a photon source, waveguide, photodetector, and a substrate, having a waveguide core made of Si.

In other embodiments, the present invention provides a silicon quantum photonic integrated circuit (SiQuPIC) having a photon source, waveguide, photodetector and a substrate, wherein said photodetector is a waveguide-integrated superconducting nanowire single-photon detector (SNSPD).

In other embodiments, the present invention provides a silicon quantum photonic integrated circuit (SiQuPIC), in which traveling-wave SNSPDs are fabricated by integrating them directly, via an optical waveguide, with SQLED devices, all on a single Si chip.

In other embodiments, the present invention provides superconducting quantum-dot light-emitting diodes (SQLEDs), whose operation is based on Cooper-pair interband transitions in a semiconductor that result in simultaneously generated photon pairs.

In other embodiments, all components of quantum photonic integrated circuit are monolithically integrated on a substrate other than silicon, for example a III-V substrate, SiC, sapphire, etc.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1A:
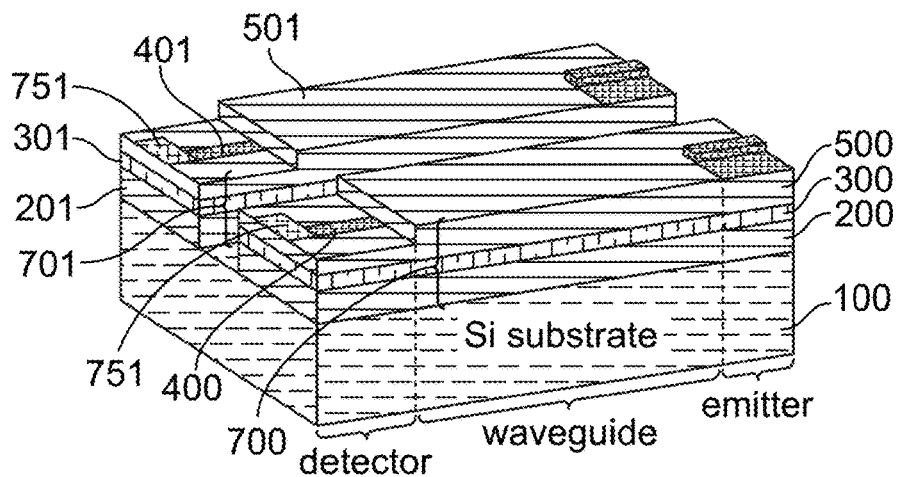
FIG. 1A provides a schematic view of two adjacent SiQuPICs, each comprising photon source, waveguide, and photodetector.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

Novel Integrated Silicon Photonics Platforms for Scalable Quantum Systems

The unique behavior of quantum systems, such as coherence, superposition, and entanglement, can be harnessed to process, encode, and transmit information. Each quantum application (communication, computing, metrology, sensing, etc.) places its own set of requirements on the underpinning photonic technology, but many of these requirements are common to all the applications, and they form the basis of silicon quantum photonic integrated circuits (SiQuPICs) disclosed in this invention. These common elements include single- or entangled-pair photon sources, passive optics to coherently mix photonic modes, active optics and delay lines to reconfigure those modes, high extinction ratio filters, and single-photon detectors. These elements can be integrated on a single Si chip, with scalable defect-free heterogeneous integration of dissimilar materials enabled by their nanosize. In particular, III-V nanopillars or horizontal nanowires can be grown directly on Si by molecular beam epitaxy (MBE) or by metalorganic chemical vapor deposition (MOCVD), with $SiO_2$ serving as a mask defining the lateral size of the nanowires. The same $SiO_2$ material can also play a role of vertical and lateral claddings for the waveguide core. III-V quantum dots (QDs) can be grown epitaxially within the nanopillars or nanowires, and can serve as either single-photon emitters or entangled-photon-pair emitters. As an alternative to direct epitaxial growth, a wide range of single-photon and entangled-photon-pair photon sources can be explored by inserting separately synthesized colloidal nanostructures inside the III-V nanopillars or nanowires after the initial growth of lower half of the epitaxial structure, and subsequently growing the upper half. Since the growth rate of the epitaxial material can be precisely controlled, the nanostructures can be easily positioned at the correct height for direct coupling into $Si_3N_4/SiO_2$ waveguides fabricated by chemical vapor deposition (CVD) after the epitaxial growth. This process produces a highly reliable, scalable, and inexpensive fabrication of compact SiQuPICs that can be customized for each particular application of interest. The elements of the disclosed SiQuPICs can be controlled by silicon electronics, integrated on the same chip.

The embodiments of the present invention provide integrated platforms to implement novel devices for quantum information processing and quantum communications. The present invention is transformative for two main reasons: first, for implementation in a QuIP system network as well as development and realization of large-scale systems; and second, the individual components and devices that described in the present invention can achieve unprecedented performance for quantum information applications. The on-demand electrically driven single photon and entangled photon pair sources can be superconducting QD LEDs (SQLEDs), where either single electrons or Cooper pairs from the superconductor recombine in the QDs, with holes injected from the p-side of the device. Selective-area epitaxy can be used to grow GaAs (or other III-V materials) nanopillars or nanowires directly on patterned silicon, with InAs (or other III-V materials) QD emitters aligned with the cores of $Si_3N_4/SiO_2$ waveguides. The SiQuPIC can make use of the waveguide-integrated superconducting nanowire single-photon detector (SNSPD) platform. SNSPD is a type of near-infrared and visible single-photon detector based on a current-biased superconducting nanowire. A photon incident on the nanowire breaks Cooper pairs and reduces the local critical current below that of the bias current, resulting in the formation of a localized non-superconducting region with finite electrical resistance, thus producing a measurable voltage pulse. The interaction between the single-photon or photon-pair sources, detectors, and dielectric waveguides can be studied in various integrated platforms for several quantum information processing implementations, such as the characterization of path-entangled photons, multi-qubit entanglement, quantum state tomography, and a quantum communication protocol.

In other aspects, the present invention concerns embodiments for the emitter and another embodiment for the photodetector—that are both based on the use of a superconductor—for example, NbN thin films. In case of the emitter, the use of SQLEDs provides integration of the source with silicon and generation of on-demand single photons or entangled photon pairs. For the photodetectors, waveguide-integrated superconducting nanostripe single-photon detectors (SNSPDs) can be used. In case of the SQLEDs, the NbN acts as the superconducting electrode for the LED, which, depending on the cladding layer thickness, can inject either Cooper pairs or single electrons into a semiconductor QD. In the case of the SNSPDs, a NbN nanostripe coupled to an optical waveguide acts as the detector itself.

Figure 1B:
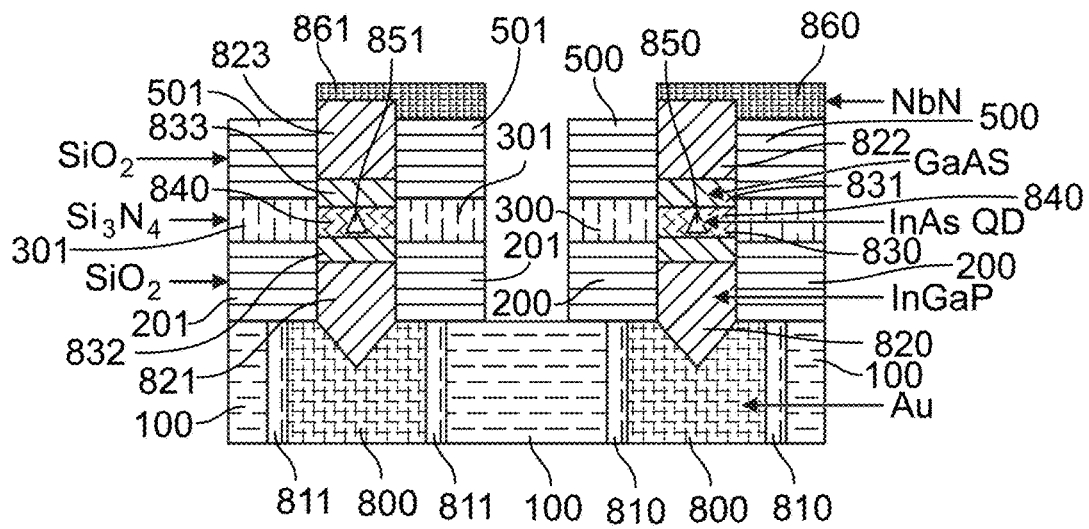
FIG. 1B is a cross-sectional view of two adjacent single-photon-emitter SQLEDs on Si substrate.
Figure 1C:
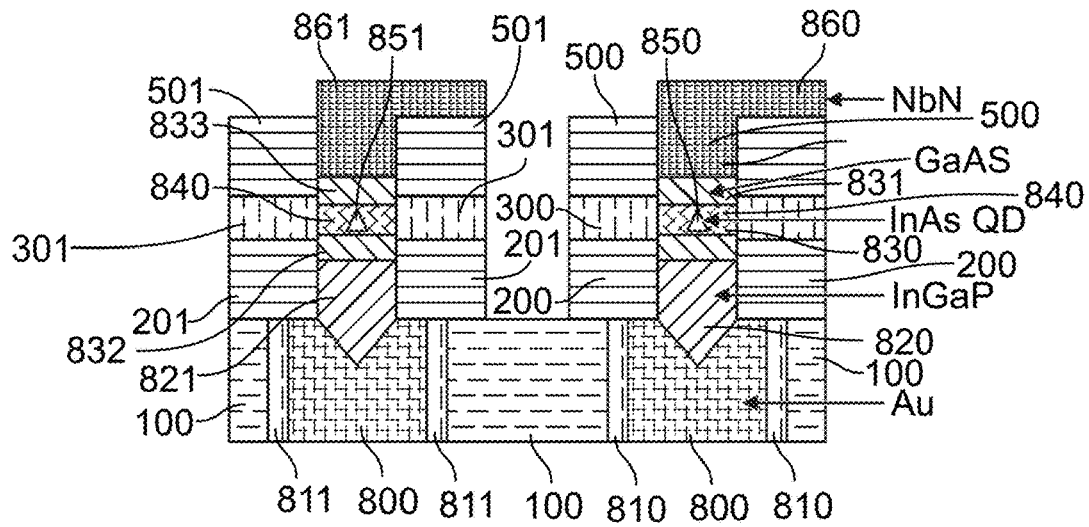
FIG. 1C is a cross-sectional view of two adjacent entangled-photon-pair emitter SQLEDs on Si substrate.
Figures 2A, 2B, 2C, 2D, 2E:
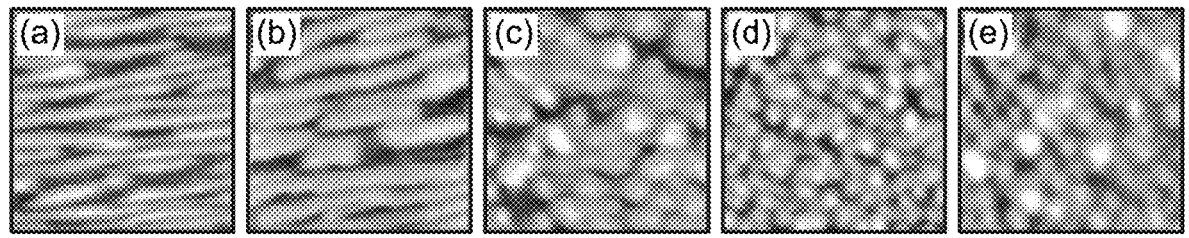
FIGS. 2A, 2B, 2C, 2D and 2E show atomic-force microscopy (AFM) scans of InAs quantum dashes (Qdashes) on $Ga_{0.47}In_{0.53}As$ buffer grown on a (001) InP substrate. The equivalent coverage of InAs (the thickness of an equivalent continuous layer of InAs with the same total volume as the volume of Qdashes) is (a) 8 Å, (b) 11 Å, (c) 18 Å, (d) 24 Å and (e) 30 Å. The scan size is 500 nm×500 nm and the elongation direction of the dashes is [1-10].
Figures 3A, 3B:
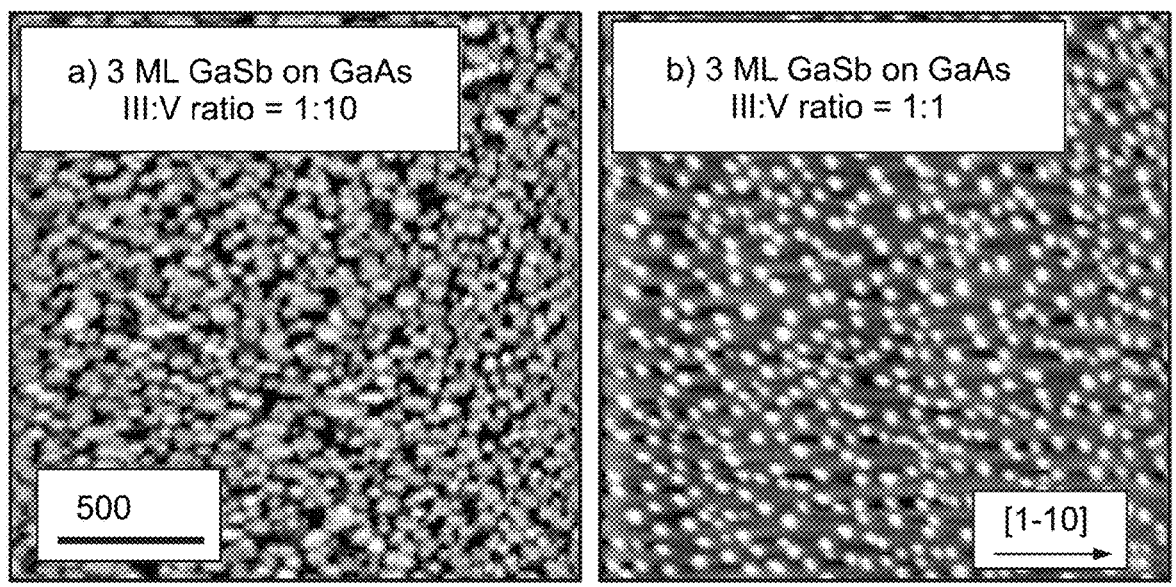
FIGS. 3A, 3B, 3C and 3D show AFM and reflection high-energy electron diffraction (RHEED) images of interfacial-misfit (IMF) and Stranski-Krastanow (SK) QDs.
Figures 3C, 3D:
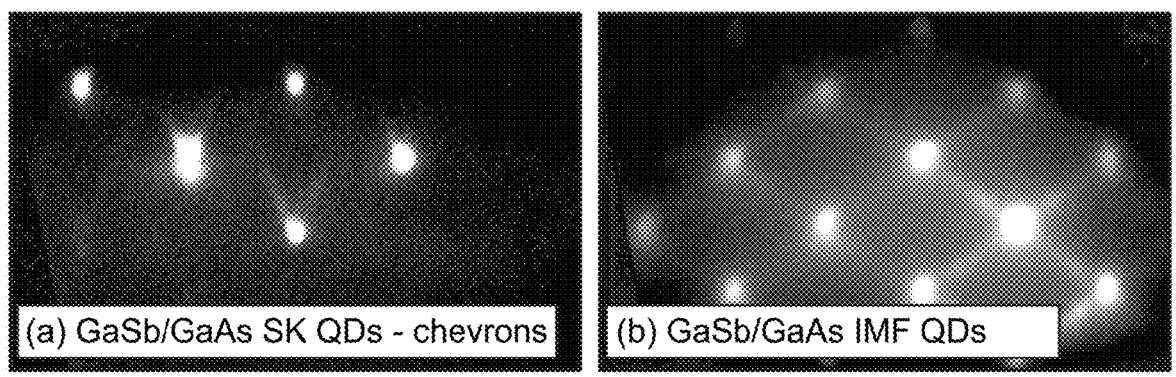

A complete schematic of the novel SiQuPIC architecture for two parallel single-channel QC links with their various components is shown in FIG. 1A, along with a cross-sectional view of a pair of single-photon emitting SQLEDs in FIG. 1B and a cross-sectional view of an entangled-photon-pair-emitting SQLED in FIG. 1C. The entire structure shown in FIG. 1A is fabricated on a silicon substrate 100 coated with a layer of $SiO_2$ 200 and 201 that also serves as a bottom cladding for the waveguides. A $Si_3N_4$ waveguide core layer 300 and 301 is deposited on top of the $SiO_2$ layer 200 and 201. For each QC link, a superconducting nanowire single-photon detector (SNSPD) 400 and 401 is deposited on top of the $Si_3N_4$ waveguide core layer 300 and 301 or in close proximity (less than 1 μm) to the core. A top cladding $SiO_2$ layer 500 and 501 is deposited on the $Si_3N_4$ waveguide core layer 300 and 301. Single-photon- or entangled-photon-pair-emitting SQLEDs 600 and 601 are grown directly on the Si substrate 100 by opening windows for selective-area epitaxy in the top $SiO_2$ layer 500 and 501, the $Si_3N_4$ layer 300 and 301, and the bottom $SiO_2$ layer 200 and 201. Those windows can have a circular, square, or polygon shapes for the growth of nanopillars, or a rectangular shape for the growth of nanowires. Individual waveguides 700 and 701 are created by removing the dielectric materials 200, 300 and 500 between them. Standard Au electrodes 750 and 751 can be used for wire bonding.

In other embodiments of the present invention, the $Si_3N_4$ core 300 and 301 is narrower than the lateral $SiO_2$ claddings 200 and 201, thus forming a buried waveguide.

All elements of SiQuPIC can be fabricated at multiple locations required for a particular QuIP application, including standard waveguide-based elements such as MZIs, couplers, splitters, phase-shifters, modulators, resonators, filters, etc.

Additional details of a pair of integrated SQLEDs are shown in FIG. 1B for other embodiments of the present invention. Bottom gold contacts 800 and 801 are connected to the nanopillar or nanowire SQLED through a via in the substrate, and isolated from the substrate by $Si_3N_4$ cylindrical side walls 810 and 811. Alternatively, lateral contacts can be deposited directly on $SiO_2$. Each p-n junction LED consists of two InGaP claddings (p-doped 820 and 821, and n-doped 822 and 823), two undoped GaAs barriers 830, 831, 832, and 833, an undoped InGaAs quantum well 840 and 841, and an undoped InAs quantum dot 850 and 851. The top electrodes 860 and 861 are made of a superconducting material, for example NbN. As shown in FIG. 1B, the QDs 850 and 851 are aligned with the $Si_3N_4$ cores 300 and 301 of the dielectric waveguide.

FIG. 1C illustrates the cross section of an entangled-photon-pair emitter design. All elements in FIG. 1C have the same designation as in FIG. 1B. The undoped i-region (quantum well 840 and barriers 830 and 831) in the p-i-n diode structure should be very thin. This is because the Cooper pairs typically can travel for only ~50 nm from the NbN electrode before they dissociate, due to a proximity effect at the superconductor/semiconductor interface. Thus, for Cooper-pair injection, the NbN electrodes have to be at a distance of no more than 50 to 60 nm from the QDs. To achieve this in a SiQuPIC that contains both single-photon and entangled-photon-pair emitters, selective-area etching can be used to remove the top InGaP cladding 822 of the structure. There is sufficient etch contrast between InGaP and GaAs, such that the etching can leave the top 50-nm-thick GaAs barrier 831 intact.

In other embodiments of the present invention, the QDs extend through the entire width of the nanopillars, and no quantum wells are used.

In other embodiments of the present invention, other combinations of III-V materials, known from prior art, can be used to form a p-n junction QD LED.

In other embodiments of the present invention, superconducting electrodes are deposited on top of the bottom Au contacts 800 and 801 for injection of hole Cooper pairs.

SQLEDs can serve as sources for the efficient generation of single photons as well as photon pairs. Single pairs of quantum states in semiconductor QDs result in exciton emission, whereas higher-level excitations result in additional biexciton emission. Strong correlation between the two has been observed, but it has been difficult to confirm quantum entanglement of the biexciton and exciton photon pairs mainly due to lifting of spin degeneracy of intermediate exciton states caused by crystallographic anisotropy of semiconductor surfaces and electron-hole exchange interactions.

A technique to achieve entangled photon pairs is through the injection of Cooper pairs of charge carriers into a QD. This can be achieved by using SQLEDs, where electron Cooper pairs from the superconductor recombine with a pair of holes or hole Cooper pairs in the semiconductor QD to simultaneously emit a pair of entangled photons. In addition, entangled photon pairs can be generated on demand, as the number of holes on the ground-state energy level of the QD is limited to two per excitation by the Pauli's exclusion principle.

As shown in FIG. 1B, QD single-photon sources may use InAs QDs grown on GaAs barriers with emission wavelengths shorter than 1.3 μm. Emission wavelength of InAs QDs grown on GaAs barriers can be extended up to 1.55 μm by using InGaAs metamorphic buffer layers. An alternative embodiment extends the emission wavelength region from 1.3 μm to 2.0 μm is based on InAs nanostructures grown on InP barriers. Another embodiment grows GaSb QDs on GaAs barriers. These QDs can be grown in a variety of shapes and sizes with broadly tailored optical properties.

InAs nanostructures grown on InP substrates exhibit different shapes and sizes depending on the growth conditions and the crystallographic orientation of the substrate. Self-assembled InAs nanostructures grown on lattice matched $(Al_xGa_{1-x})_{0.47}In_{0.53}As$ buffers on InP (001) substrates do not form QDs, but elongated asymmetric structures that have been called quantum dashes. Cylindrical symmetric InAs QDs can be achieved by growing the InAs nanostructures on InP (311)B substrates. Quantum wells improve carrier capture efficiency, because the quantum well extends everywhere in a 2-dimensional plane, whereas the Qdashes alone only cover a part of the area that is proportional to their density, length and width. In one embodiment of this invention, a dot-in-a-well (DWELL) structure can be used for generation of single photons and entangled photon pairs. In another embodiment, the elongated nanostructures can be used for the production of entangled photon pairs.

FIGS. 2A-2E show AFM surface images of InAs Qdashes on a $Ga_{0.47}In_{0.53}As$ buffer grown on a (001) InP substrate with varying amounts of InAs coverage. This set of images clearly indicates the extent to which the shape and size of the QD/Qdash structures can be varied. With increasing InAs coverage, eventually, islands along the [1-10] direction are formed. The shape of the Qdashes can be engineered to optimize the performance of the superconducting LEDs.

The injection of Cooper pairs into type-II QDs is highly advantageous. Type-II GaSb QDs can be grown on GaAs by either Stranski-Krastanow (SK) or interfacial misfit (IMF) growth mode. The desired growth mode can be selected by controlling the gallium to antimony (III/V) ratio, where a high III/V ratio produces IMF, while a low ratio establishes the SK growth mode. The IMF growth mode results in strain-relaxed QDs, whereas the SK QDs remain highly strained. Both ensembles demonstrate strong room-temperature photoluminescence (PL) with the SK QDs emitting at 1180 nm and the IMF QDs emitting at 1375 nm. Quantized energy levels along with a spectral blue shift are observed in 77 K PL. The IMF or the strain-relieved QDs may also be used since they can be grown as wetting-layer-free QDs with ultra-low density.

FIGS. 3A-3D show atomic force microscopy (AFM) images of both kinds of GaSb QDs on GaAs, and the corresponding RHEED patterns during the growth of theses ensembles. The SK QD ensemble shows a uniform size distribution with a slight elongation in the [110] direction—very typical of SK dots such as InAs QDs. The average width and height are 10 and 5 nm, respectively, with QD density of $\sim 3 \times 10^{10}$ QDs/cm². The IMF QDs are more elongated along the [1-10] direction in comparison to the [110] direction. The QD dimensions are widely varied, with average length along the [110], width along the [1-10], and height of 50, 30, and 6 nm, respectively. The QD density is $\sim 6 \times 10^{10}$ QDs/cm². The RHEED patterns observed during the growth of the two QD ensembles are as follows—both QDs are nucleated on a 2×4-reconstructed atomically smooth GaAs surface and while SK dots show the classical "chevron" pattern associated with strained QD formation, the IMF dots instead show components that belong to {111} and {100} planes, indicating a relaxed form.

Figure 4A:
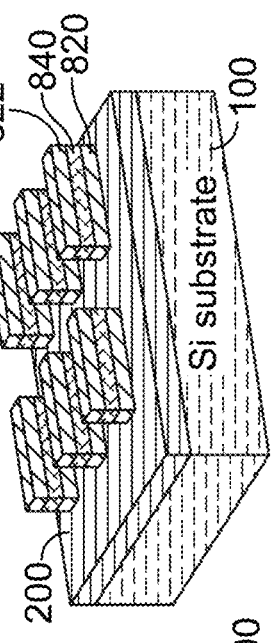
FIGS. 4A, 4B, 4C, 4D, 4E and 4F illustrate an epitaxial growth schematic for the fabrication of the SQLED structures on patterned silicon.
Figure 4C:
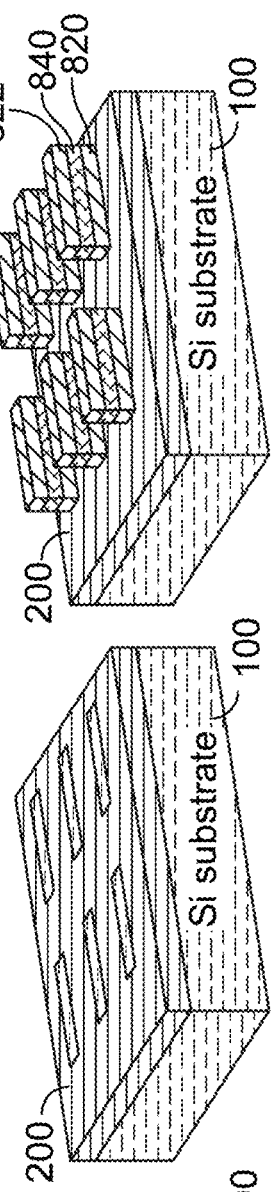
Figure 4E:
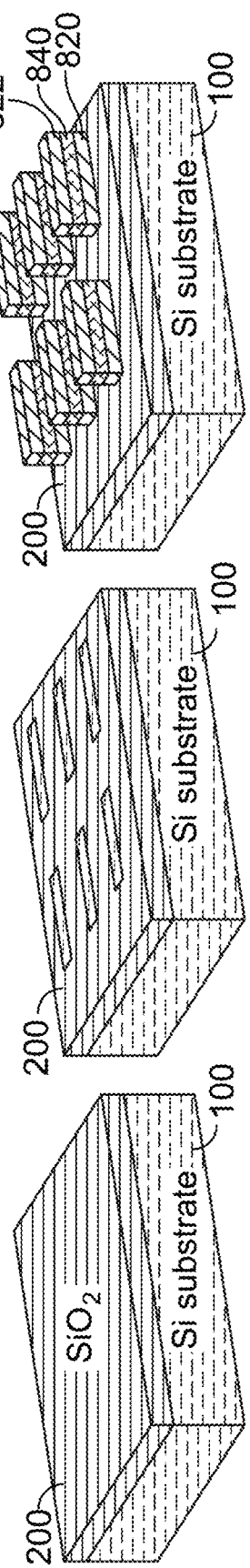
Figure 4B:
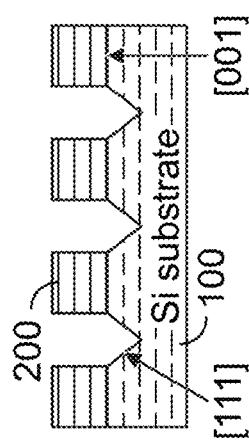
Figure 4D:
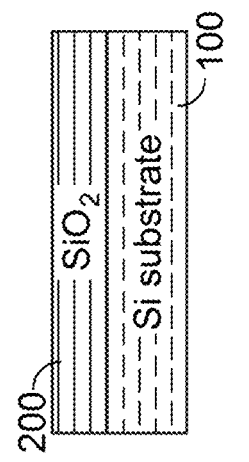
Figure 4F:
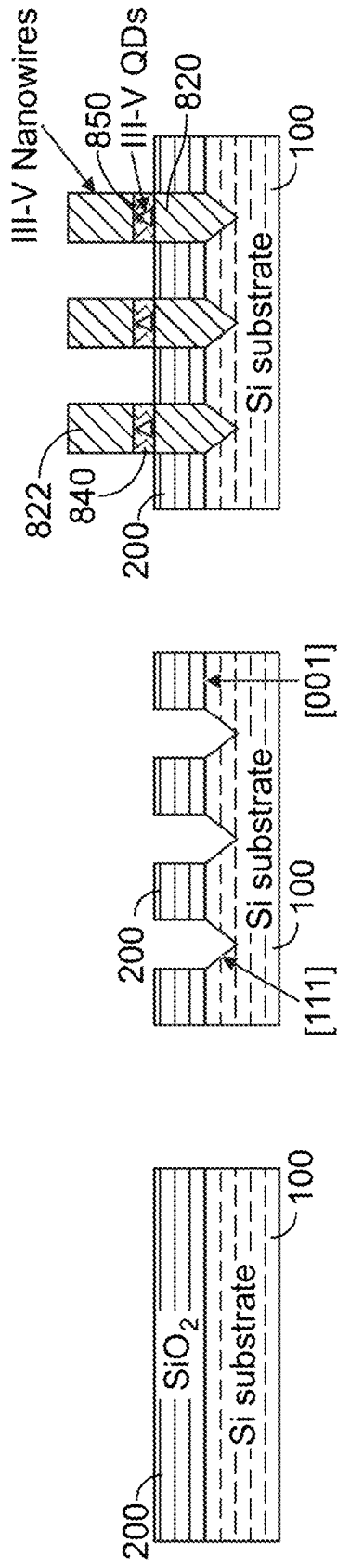

Selective-area epitaxy can be used to grow the emitters directly on Si, using $SiO_2$ as a mask. This approach allows for the realization of self-aligned emitters, where the QDs are aligned with the $Si_3N_4$ waveguide. Since the SQLEDs require the injection of Cooper pairs of electrons and/or holes, the processing of the contacts can proceed in a manner such that the NbN electrodes are within 30-50 nm of the QD layer itself. The epitaxial structure can be grown on a silicon substrate, with an initial GaAs nucleation layer, as shown in FIG. 4 for the case of epitaxial growth of nanowires with embedded QDs. The GaAs nucleation layer can be grown in the openings in $SiO_2$ mask 200 (FIGS. 4A and 4B), exposing silicon substrate 100 (FIGS. 4C and 4D). The growth of the GaAs nucleation layer can be followed by the growth of an InGaP cladding layer 820 with the composition lattice-matched to GaAs. Following the InGaP layer 820, a GaAs barrier layer 830 can be grown (not shown in the figure), with the QDs 850 embedded in the InGaAs quantum-well layer 840. Proper optimization will get the density of the QDs low enough to realize a single QD per device. Site-specific nucleation of the QDs can be used to place the dots at a specific location in the InGaAs quantum well. The quantum-well layer 840 can be capped with GaAs barrier 831 (not shown in the figure), followed by a top InGaP layer 822. The top InGaP layer 822 can be n-doped, and the bottom InGaP layer 820 can be p-doped. The QDs and the quantum wells do not need to be doped.

SNSPDs integrated on Si substrates may be used as photon counting and sensing tools. Moreover, SNSPDs are currently the best detectors for counting and sensing photons over a wide range of wavelengths, from visible light to mid-infrared range. Finally, SNSPDs can reach close to 100% detection efficiency, which is absolutely critical for the successful operation of quantum systems in the present invention.

Traveling-wave SNSPDs can be fabricated by integrating them directly, via an optical waveguide, with SQLED devices, all on a single Si chip (see FIG. 1A). The most often designed SNSPDs consist of large-area (typically 10×10 $\mu m^2$) square meanders, with photons approaching the device at the direction normal to the detector plane. For an SNSPD efficiently coupled to a dielectric optical waveguide, a preferred geometry is the traveling-wave structure. However, instead of light being externally coupled to optical waveguides via grating couplers as was commonly done in prior art, direct coupling to integrated SQLED is used in the present invention.

In other embodiments of the present invention, the photons generated by the SQLED can be directly delivered to the SNSPD via a $Si_3N_4/SiO_2$ waveguide fabricated directly in the Si chip (see schematic drawing shown in FIG. 1A).

The superconducting nanostripe can be deposited directly on top of a thinned $SiO_2$ cladding of the optical waveguide, so that the evanescent field outside the waveguide is absorbed by the stripe. If the interaction distance is long enough, the absorption can be close to unity. Typical dimensions of the NbN nanostripe are ~4 nm in thickness, ~150 nm in width, and ~100 µm in length. The nanostripe can be either deposited as a single element located at the center of the waveguide, or it can have a form of a single or multiple U-shaped loops.

In other embodiments of the present invention, the waveguide-coupled SNSPD forms a part of a quantum photonic integrated circuit as an integrated-circuit chip platform. The entangled photon pairs generated by injection of Cooper pairs or single photons can be emitted directly by the SQLED into the waveguide.

Quantum Function Demonstrations Using the Monolithically Integrated Silicon Photonics Platforms Quantum information processing (QuIP) generally, and quantum computing especially, exploit quantum correlations of photons, such as quantum entanglement, to achieve performance levels beyond what is potentially achievable in classical systems. The SiQuPICs of the present invention can provide a robust platform to generate entangled photon pairs through nonlinear interactions or by using embedded sources. QDs embedded in nanopillars or nanowires can be used for the on-demand generation of single photons or entangled photon pairs. An integrated platform incorporating high quality-factor resonators can also be used to substantially enhance the effective Kerr nonlinearity and generate correlated photon pairs via the spontaneous four-wave mixing (FWM) mechanism.

In practice, the coherent dynamics of photons and correlations among them should be controlled in order to generate the required quantum states (e.g., N00N states) in an integrated photonics platform. This can be demonstrated by focusing on the manipulation and tailoring of the joint spectral amplitude of the photon pairs using SiQuPIC chips. Electric-field-based optical modulators in silicon have experienced dramatic improvements over the last years and the modulation bandwidth has increased many-folds. Moreover, the possibility of multi-spatial-mode waveguides and high-dimensional entanglement is quite attractive in the silicon-based platform.

The state of the generated photons can be manipulated and various measurements can be performed on such states. The available sources can generate single photons or photon pairs. The optical elements that can be used are integrated waveguides, waveguide junctions, and phase modulators. The fundamental measurement that can be carried out on single-photon sources is the Hanbury Brown and Twiss (HBT) effect, which measures the anti-correlation in the photon counts received by two detectors. The single photons arriving at the 50:50 directional coupler can either be detected in one detector or the other, and no coincidences should be measured.

In practice, the coincidence count as a function of a delay between the two detectors registers a function of the shape that gives information about the quantum autocorrelation function $g^{(2)}(\tau)$, as a function of the time delay variable $\tau$. A similar scheme can be applied for the photon-pair generator in a heralded detection scheme, where the detection of one photon heralds the imminent arrival of the second photon. The detection of the first photon can be used as a trigger for the measurements by two detectors. It is expected, at least for the single-photon source, that $g^{(2)}(0) < 1$, corresponding to an anti-bunched quantum source. The heralded detection scheme for the photon pair can potentially result in $g^2(0) > 1$, depending on the degree of correlation between the two photons. For example, photon pairs generated via nonlinear FWM result in a thermal source with $g^{(2)}(0)=2$ under such a heralded measurement scheme. As such, this measurement gives a good insight into the statistics of the photon pair.

Another experiment that can be carried out is the over-complete quantum tomography of a path-entangled two-photon state. Path-entangled N00N states can be obtained and the Hong-Ou-Mandel (HOM) experiment can be performed with indistinguishable single photons. The two inputs of a 50:50 directional coupler can be impinged on by two identical photons, using two identical single-photon sources. The output can be a path-entangled N00N state of the form 2002 (N=2). On-chip phase shifts can be used to implement an overcomplete set of projective measurements on two qubits to reconstruct the density matrix. The entanglement can be verified by the Clauser-Horne-Shimony-Holt (CHSH) inequality as a further proof that the so-called entanglement cannot be reproduced by local hidden variable theories. Another possible experiment is the path entanglement of two photon pairs using four identical single-photon sources or using two photon-pair sources.

The photon-pair source can be studied in interference experiments as well. An important route is the polarization characterization of the two generated photons. For many experiments, the two-photon states need to be split into two separate single photons. This cannot be achieved simply using a 50:50 directional coupler, because 50% of the time one obtains 2 photons in one output arm and nothing in the other. If the two photons are generated in orthogonal polarizations, an integrated polarization beam splitter must be implemented. Another option to separate the two photons is based on the conservation of momentum, where the two photons can be possibly ejected in opposite directions and the routed from the front and back of the source. If the photons in a photon-pair source are ejected in opposite directions, their statistics can be characterized using two Y-junction waveguide splitters positioned on either side of the photon source, with four detectors used to measure the incidence and coincidence counts.

After a successful characterization of the sources, basic Alice-Bob communication protocols can be explored, using the BB84 protocol based on single-photon sources and BBM92 based on entangled-photon-pair sources. The BB84 algorithm can be based on the phase-encoding. BBM92 can be primarily based on path entanglement or possibly phase-encoding. There is also a potential for coupling of the source and the detector to an optical fiber, where the vision is to create an integrated transceiver based on the described technologies.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An electronic device having a quantum photonic integrated circuit (QuPIC) comprising: a single- or entangled-pair photon source;
   a single- or entangled-pair photon detector;
   an optical waveguide configured for guiding the photons from the source to the detector, said optical waveguide comprising a waveguide core and waveguide cladding; and
   said single- or entangled-pair photon source, said photon detector and optical waveguide integrated on a common substrate.

2. The device of claim 1, wherein said substrate is silicon, forming a silicon quantum photonic integrated circuit (SiQuPIC).

3. The device of claim 1, wherein said single- or entangled-pair photon source is a semiconductor quantum-dot light-emitting diode (QDLED).

4. The device of claim 3, wherein said QDLED is grown as a nanopillar on said substrate using selective-area epitaxy.

5. The device of claim 3, wherein said QDLED is grown as a nanowire on said substrate using selective-area epitaxy.

6. The device of claim 3, wherein said semiconductor QDLED comprises at least one superconducting electrode, thus forming a superconducting quantum-dot LED (SQLED).

7. The device of claim 6, wherein said superconducting electrode is less than 60 nm from said quantum dot, enabling injection of electron Cooper pairs into said SQLED, resulting in entangled photon pair emission.

8. The device of claim 6, wherein said superconducting electrode is less than 60 from said quantum dot, enabling injection of hole Cooper pairs into said SQLED, resulting in entangled photon pair emission.

9. The device of claim 6, wherein said superconducting electrodes are less than 60 nm from said quantum dot, enabling injection of both electron- and hole Cooper pairs into said SQLED, resulting in entangled photon pair emission.

10. The device of claim 1, wherein said single- or entangled-pair photon source includes an active region and said optical waveguide includes said waveguide core having a center, said active region is aligned with said center of said optical waveguide core.

11. The device of claim 10, wherein said waveguide core is made of silicon nitride.

12. The device of claim 10, wherein said optical waveguide core is made of silicon.

13. The device of claim 10, wherein said waveguide includes claddings, said claddings are made of silicon dioxide.

14. The device of claim 1, wherein said photon detector is a superconducting nanowire single-photon detector (SNSPD).

15. The device of claim 1, wherein said SNSPD is fabricated directly on said waveguide core.

16. The device of claim 14, wherein said waveguide includes a cladding and said SNSPD is fabricated on said waveguide cladding, in close proximity to said waveguide core.

17. The device of claim 1, comprising multiple single-photon or entangled-photon-pair sources, waveguides, and photon detectors, combined with at least one additional element of a QuPIC, said element belonging to the group of Mach-Zehnder interferometers, couplers, splitters, phase-shifters, modulators, resonators, filters, all integrated on said common substrate.

18. A silicon quantum photonic integrated circuit (SiQuPIC) comprising: a single- or entangled-pair photon source, optical waveguide, and photodetector all integrated on a silicon substrate.

19. The SiQuPIC of claim 18 wherein said single- or entangled-pair photon source is a semiconductor QD LED.

20. The SiQuPIC of claim 19 wherein the semiconductor QD LED comprises a superconducting material, thus forming a superconducting quantum-dot light-emitting diodes (SQLED).

21. The SiQuPIC of claim 20 wherein said superconducting material is adjacent to a quantum well embedding QDs, enabling entangled photon pair emission.

22. The SiQuPIC of claim 19 wherein selective-area epitaxy is used to grow said semiconductor QD LED directly in $SiO_2$ grooves.

23. The SiQuPIC of claim 19 wherein said optical waveguide includes said waveguide core having a center, and said semiconductor QD LED is aligned with said waveguide core center.

24. The SiQuPIC of claim 23 wherein said waveguide core is made of $Si_3N_4$.

25. The SiQuPIC of claim 23 wherein said waveguide core is made of $SiO_2$.

26. The SiQuPIC of claim 18 wherein said photodetector is a waveguide-integrated superconducting nanowire single-photon detector (SNSPD).

* * * * *